[51.]

John Gibson Jr. Albany, N.Y.

119,086.    Table-Basket or Dish.    Patented Sep. 19, 1871.

Witnesses:
C. E. Van Zandt
A. L. Van Zandt

John Gibson Jr.
Inventor.

UNITED STATES PATENT OFFICE.

JOHN GIBSON, JR., OF ALBANY, NEW YORK.

IMPROVEMENT IN TABLE-BASKETS OR DISHES.

Specification forming part of Letters Patent No. 119,086 dated September 19, 1871.

*To all whom it may concern:*

Be it known that I, JOHN GIBSON, Jr., of the city and county of Albany, State of New York, have invented certain new and useful Improvements in Table-Baskets or Dishes for holding or serving bread, cake, fruit, nuts, preserves, and similar articles; and I do hereby declare that the following is a specification thereof, reference being had to the accompanying drawing making a part of this specification, in which—

Figure 1:
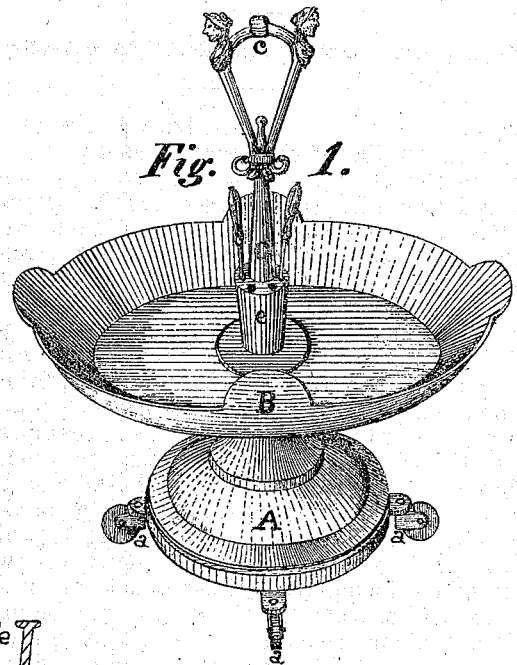
Figure 2:
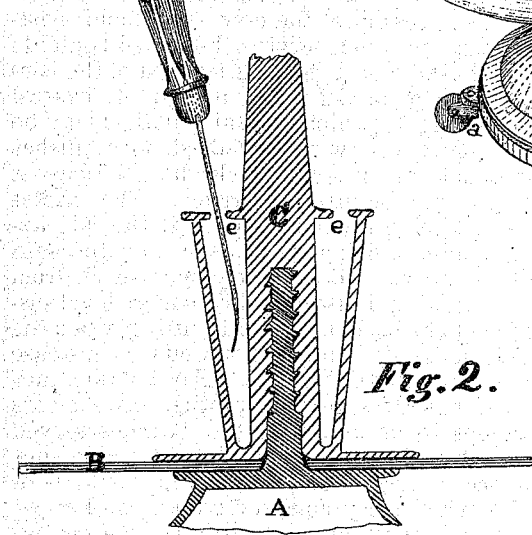
Figure 3:
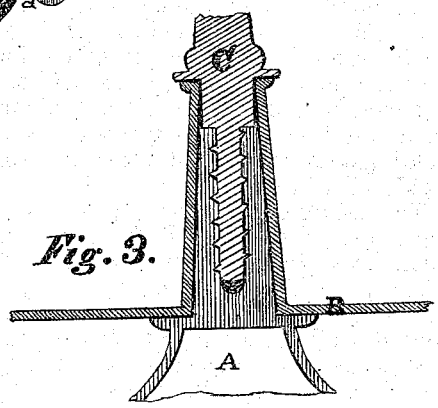

Figure 1 represents a perspective view of a table-basket or dish embodying the improvements. Fig. 2 is a longitudinal vertical sectional view (on an enlarged scale) of a section of the basket or dish and the stand or base, and illustrating the invention. Fig. 3 is the same, showing a modification of some of the parts of this invention. Fig. 4 is a vertical section of a table-basket in a modified form and embodying the principal features of this invention. Fig. 5 is a vertical view of a modification of form of base that may be used with this invention, to furnish receptacles for holding dessert-plates or other articles. Fig. 6 is a side view of the same.

The nature of my invention consists in mounting a table-basket or dish for bread, cake, fruit, nuts, preserves, &c., on caster-wheels or other wheels, to facilitate the movement of the basket or dish on a table or other surface, It further consists in pivoting the said basket or dish to the base, so as to allow the basket or dish to revolve; also, in combining with the said basket or dish, or with any of its appurtenances, suitable receptacles for holding nut-picks, knives, spoons, plates, or other instruments or articles to be used with the eatables when served from such table-basket or dish.

To enable others skilled in the art to make and use my invention I will proceed to describe it in reference to the drawing and the letters of reference marked thereon, the same letters indicating like or similar parts.

In the drawing, A represents the base for supporting the basket or dish B. The said base A I mount on caster-wheels $a$, Fig. 1, or on other wheels $a'$, Fig. 4, which wheels will enable the said basket or dish B to be readily moved from place to place on a table or other surface, thus avoiding the necessity of lifting the same, as must be done with such table-basket or dishes as now constructed; or, in some cases, if desired, the base A may be dispensed with and the caster-wheels $a$ or other wheels $a'$ may be attached directly to the table-basket or dish B. The basket or dish B is supported by the base A and pivoted to the same, as shown in Figs. 1, 2, and 3, where the said basket or dish is revolved round a central handle-stem C, somewhat in the manner of a table-caster, and, being thus pivoted, any side of said basket or dish may be readily reached by revolving the same, and would thus readily present for selection any article from a variety which may be contained therein, and thus obviating the necessity of the now usual hand-twisting or turning, when serving the varied contents of such baskets or dishes. Attached to the central stem or pivot C I make an upright central handle $c$, Fig. 1, (which central handle $c$ may be used equally well with table-baskets or dishes that do not revolve,) by which the said basket or dish B may be lifted or carried. The basket or dish B, being thus provided with the said upright handle $c$ rising from its center, the said handle is always within convenient reach from any side, and will also maintain a more level suspension of the basket or dish in lifting, when the same is unevenly loaded, than would be the case with swinging bail-handles. For holding nut-picks, fruit-knives, plates, or other instruments or articles to be used with the eatables served from such table-basket or dish B I provide suitably-formed receptacles for such instruments or articles, which receptacles $e\,e$ for nut-picks, knives, spoons, &c., may be placed around the central stem $c$ or handle, as in Figs. 1 and 2; or the said receptacles may be placed at convenient points along the sides of or beneath the basket or dish B as receptacles $e'$, Fig. 4, or in or on the base A, as shown, (for plates,) in receptacles $e''$, Figs. 4, 5, and 6. By this part of my invention the instruments or other articles, as in Figs. 1, 2, 4, and 6, necessary to be used when eating of the articles served from the said table-basket or dish B, can be presented at the same time in convenient readiness and position for distribution and use, whereas in the old way a second serving of such instruments or articles is necessary.

In these improvements I do not confine myself to any particular form of either the base, basket, dish, or handle, or the manner of pivoting the said basket or dish B to render it capable of being revolved, as it may be pivoted from the base up into and within the basket, as in Fig. 2, or from the basket down into the base A, as in Fig. 3, either of which modes would result the same; nor do I confine myself as to the material used in their construction, as they may be made in whole or in part of metal, glass, wood, or other suitable material, according to the purpose for which they are intended to be used, as wood might be suitable for a nut-basket, glass for preserves, and metal for cake-baskets, &c.; neither do I confine myself to the form of the receptacles $e$ $e'$ $e''$, or their number, size, or location, as circumstances or use may require a variation of either.

Having described my invention, what I claim, and desire to secure by Letters Patent, is—

1. Mounting or supporting the table-basket or dish B on wheels, substantially as described, for the purpose specified.

2. The table-basket or dish B, constructed to be revolved upon the base A, substantially as specified and shown.

3. A table-basket or dish B, when provided with a central handle, $c$, substantially as and for the purpose set forth.

4. The receptacles $e$, $e'$, or $e''$, in combination with a table-basket or dish B, substantially as and for the purposes set forth.

JOHN GIBSON, Jr.

Witnesses:
C. E. VAN ZANDT,
A. L. VAN ZANDT.

(51.)